United States Patent
Bigham et al.

(10) Patent No.: US 9,772,816 B1
(45) Date of Patent: Sep. 26, 2017

(54) TRANSCRIPTION AND TAGGING SYSTEM

(71) Applicant: Google Inc., Mountain View, CA (US)

(72) Inventors: Jeffrey Bigham, Pittsburgh, PA (US); Walter Lasecki, Woodbridge, VA (US); Thiago Teixeira, San Francisco, CA (US); Adrien Treuille, San Francisco, CA (US)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 14/578,586

(22) Filed: Dec. 22, 2014

(51) Int. Cl.
| | |
|---|---|
| *G06F 17/27* | (2006.01) |
| *G06F 3/16* | (2006.01) |
| *G10L 15/26* | (2006.01) |
| *G10L 15/22* | (2006.01) |
| *G06F 17/24* | (2006.01) |
| *G10L 15/08* | (2006.01) |

(52) U.S. Cl.
CPC .......... *G06F 3/167* (2013.01); *G06F 17/2785* (2013.01); *G10L 15/22* (2013.01); *G10L 15/265* (2013.01); *G06F 17/243* (2013.01); *G06F 17/248* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,035,807 B1 | 4/2006 | Brittain et al. | |
| 8,412,523 B2 | 4/2013 | Beach et al. | |
| 8,588,378 B2 | 11/2013 | Davies et al. | |
| 8,644,550 B2 | 2/2014 | Basson et al. | |
| 9,257,115 B2 * | 2/2016 | Waibel | G10L 15/00 |
| 9,449,600 B2 * | 9/2016 | Bayley | G10L 15/26 |
| 2002/0032591 A1 | 3/2002 | Mahaffy et al. | |
| 2004/0006481 A1 * | 1/2004 | Kiecza | G10L 25/78 704/276 |
| 2011/0022387 A1 * | 1/2011 | Hager | G06Q 10/107 704/235 |
| 2012/0016671 A1 * | 1/2012 | Jaggi | G10L 15/22 704/235 |
| 2013/0044130 A1 * | 2/2013 | Geisner | G09G 5/00 345/633 |
| 2013/0317818 A1 * | 11/2013 | Bigham | G10L 15/265 704/235 |
| 2015/0039292 A1 * | 2/2015 | Suleman | G06F 17/289 704/9 |

(Continued)

*Primary Examiner* — Richard Zhu
(74) *Attorney, Agent, or Firm* — McDonnell Boehnen Hulbert & Berghoff LLP

(57) ABSTRACT

Example systems and methods may facilitate processing of voice commands using a hybrid system with automated processing and human guide assistance. An example method includes receiving a speech segment, determining a textual representation of the speech segment, causing one or more guide computing devices to display one or more portions of the textual representation, receiving input data from the one or more guide computing devices that identifies a plurality of chunks of the textual representation, determining an association between the identified chunks of the textual representation and corresponding semantic labels, and determining a digital representation of a task based on the identified chunks of the textual representation and the corresponding semantic labels.

16 Claims, 10 Drawing Sheets

(56) References Cited

U.S. PATENT DOCUMENTS

2015/0356057 A1\* 12/2015 Subramanian .......... G06F 17/21
704/9
2016/0306784 A1\* 10/2016 Bradley ................ G06F 17/243
2016/0357987 A1\* 12/2016 Heo ...................... G06F 3/0481

\* cited by examiner

TRANSCRIPTION AND TAGGING SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

As computing devices become smaller and more portable, traditional input devices such as keyboards, mice, and even touchscreens, may not be as feasible as they once were. As such, speech-based interfaces are becoming an increasingly popular way of allowing users to interact with their computing devices. Speech-based interfaces may be particularly useful on wearable devices such as smartwatches or head-mountable displays (HMDs) or on mobile phones, where other types of user-input devices and/or other modalities of user input may be limited, or may not even be feasible.

SUMMARY

Example embodiments may facilitate processing of voice commands using a hybrid system with automated processing and human guide assistance. For example, a voice command may be given to a mobile phone or a smartwatch to send an email, get directions, or record notes. To process the voice command, one or more human guides may be provided with a guide user interface that includes a transcription or textual representation of part or all of the voice command. Using the guide user interface, the human guide(s) may identify separate chunks of the transcription that represent semantically consistent pieces of information, such as names, places, or sections of prose. The system may then determine semantic labels for each of the separate chunks of the transcription using automated reasoning and/or guide assistance. The semantically labeled chunks may be used to determine a digital representation of a task, which may be used, for example, to send an email or provide a user with directions. In further examples, multiple human guides may process different portions of the transcription in parallel to provide better response time for users.

In one example, a method is provided that includes receiving a speech segment. The method may also include determining a textual representation of the speech segment. The method may further include causing one or more guide computing devices to display one or more portions of the textual representation. The method may additionally include receiving input data from the one or more guide computing devices that identifies a plurality of chunks of the textual representation, where the identified chunks of the textual representation comprise semantically consistent pieces of information. The method may also include determining an association between the identified chunks of the textual representation and corresponding semantic labels. The method may additionally include determining a digital representation of a task based on the identified chunks of the textual representation and the corresponding semantic labels.

In another example, a system is provided that includes one or more guide computing devices and a control system. The control system may be configured to receive a speech segment. The control system may also be configured to determine a textual representation of the speech segment. The control system may be further configured to cause the one or more guide computing devices to display one or more portions of the textual representation. The control system may additionally be configured to receive input data from the one or more guide computing devices that identifies a plurality of chunks of the textual representation, where the identified chunks of the textual representation comprise semantically consistent pieces of information. The control system may also be configured to determine an association between the identified chunks of the textual representation and corresponding semantic labels. The control system may further be configured to determine a digital representation of a task based on the identified chunks of the textual representation and the corresponding semantic labels.

In a further example, a non-transitory computer readable medium having stored instructions that when executed by one or more computing systems, cause the one or more computing systems to perform functions is provided. The functions may include receiving a speech segment. The functions may also include determining a textual representation of the speech segment. The functions may further include causing one or more guide computing devices to display one or more portions of the textual representation. The functions may additionally include receiving input data from the one or more guide computing devices that identifies a plurality of chunks of the textual representation, where the identified chunks of the textual representation comprise semantically consistent pieces of information. The functions may also include determining an association between the identified chunks of the textual representation and corresponding semantic labels. The functions may additionally include determining a digital representation of a task based on the identified chunks of the textual representation and the corresponding semantic labels.

In another example, a system is provided that includes means for receiving a speech segment. The system may also include means for determining a textual representation of the speech segment. The system may further include means for causing one or more guide computing devices to display one or more portions of the textual representation. The system may additionally include means for receiving input data from the one or more guide computing devices that identifies a plurality of chunks of the textual representation, where the identified chunks of the textual representation comprise semantically consistent pieces of information. The system may also include means for determining an association between the identified chunks of the textual representation and corresponding semantic labels. The system may additionally include means for determining a digital representation of a task based on the identified chunks of the textual representation and the corresponding semantic labels.

These as well as other aspects, advantages, and alternatives will become apparent to those of ordinary skill in the art by reading the following detailed description, with reference where appropriate to the accompanying drawings.

DETAILED DESCRIPTION

Figure 1:
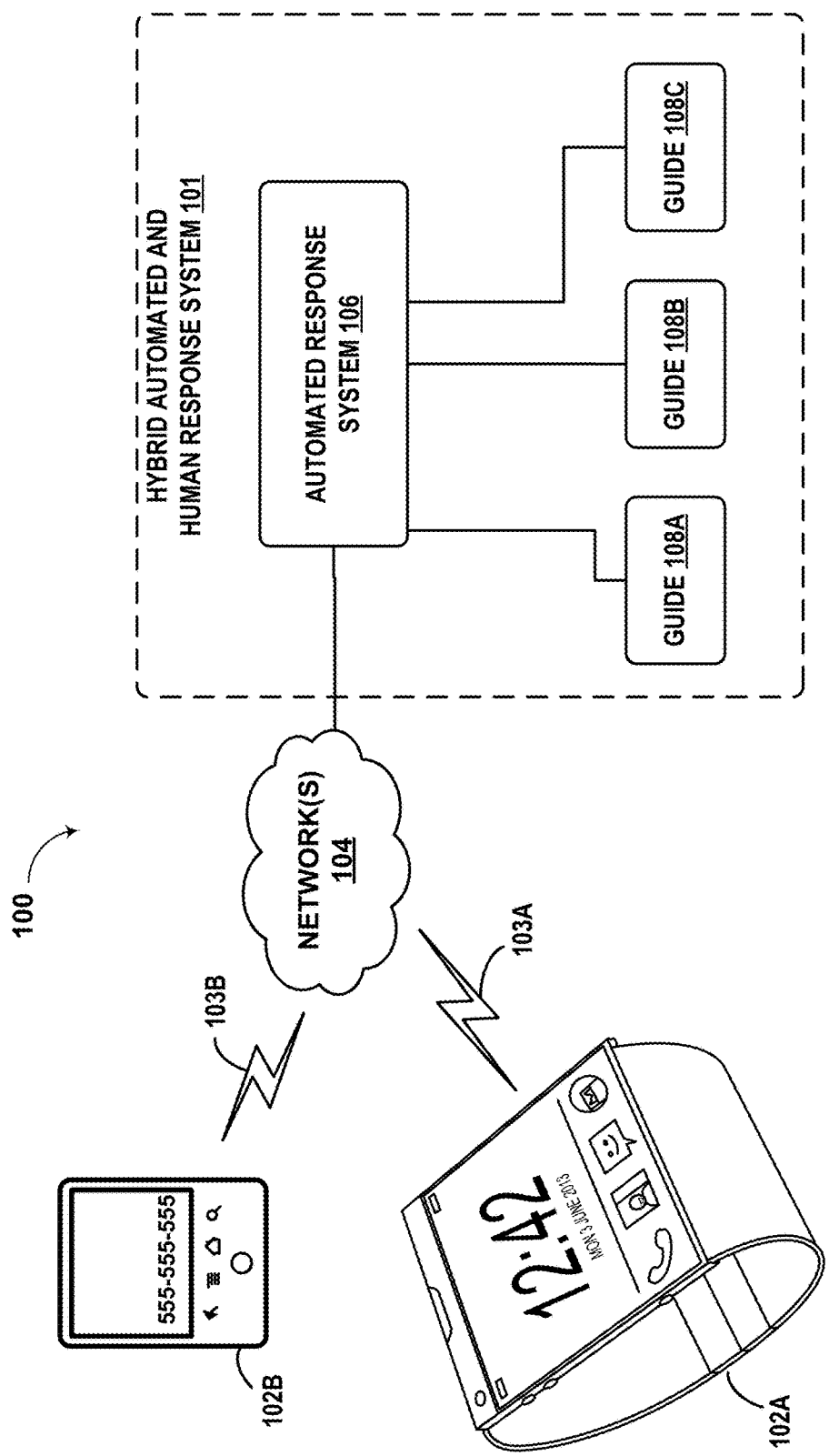
FIG. 1 is a block diagram illustrating components of a system, in which an example embodiment may be implemented.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example methods may help to facilitate automated processing of speech commands (e.g., given by a wearer of a smartwatch or an HMD) with the help of one or more human guides using one or more guide computing devices. For instance, a smart watch wearer may dictate an email to be sent (including, for example, a message body and several target recipients). One or more human guides may then be presented with a guide user interface that allows the guides to facilitate computer recognition of the requested task. Other requested tasks may also be processed, such as requests for map directions, digital note taking, or document editing.

Within examples, a guide may be presented with a guide user interface that displays a transcription of a segment of speech (e.g., from a smartwatch user) to text. The transcription of the speech segment to text may be determined using automated speech recognition (ASR), typed text from the guide, or a combination of the two (e.g., the guide may simply correct errors in ASR). In some examples, the guide also may be provided with an audio recording of the speech segment. Additionally, the playback of the audio recording may be adjusted based on word density to provide the guide with a roughly steady stream of words.

The guide may identify (or "tag") several chunks or sections of the text in order to assist a computing system in processing a requested task. In particular, the boundaries of separate chunks identified by the guide may separate semantically consistent pieces of information (e.g., names, places, sections of prose). For instance, one chunk may identify context information (e.g., send an email), a second task may identify relevant people (e.g., target recipients of an email), and a third chunk may identify prose (e.g., text for the body of the email).

In further examples, the guide may also be able to modify how the chunks are separated and/or the text within the chunks using the guide user interface as well. For instance, the text associated with each chunk may be automatically populated within a separate text box in an editing area of a guide user interface that appears below the tagging interface. A guide may navigate to the editing areas to make adjustments to boundaries of chunks and/or the text contained within the chunks.

Semantic labels may additionally be determined for each chunk of text describing how each part fits into a requested task. For instance, a system may use separate semantic labels for context, people, and prose. In some examples, the system may attempt to automatically determine the semantic labels (e.g., parse the speech segment). For instance, if text looks like a name or email address, the computing system may recognize it and label the area as such. In other examples, the guide may provide some or all of the labels (e.g., by selecting from a predetermined list of possible options). In other examples, the guide may instead be provided with the ability to easily correct labels determined by the computing system within the guide user interface.

Based on the identified chunks of text and the corresponding semantic labels, the computing system may determine a requested task and provide a digital representation of the task. For instance, the task may be to send an email, and the digital representation may be a draft email with relevant sections filled in (e.g., title, recipients, body). The computing system may consider what tasks are possible given the constraints set up by the available semantic labels. For instance, if there is an email address (recipient) and a chunk of prose, then the computing system may determine that the task could be either an email or a draft email. In some examples, a template for the digital representation of the task may be selected from a number of predefined templates. In additional examples, the system may automatically modify parts of the digital representation of the task (e.g., to provide an email with more formal language or structure). In additional examples, one or more guides may also modify parts of the digital representation of the task as well.

In further examples, handling of a speech request may be parallelized across multiple guides to reduce latency. For instance, two or more guides may each be given a certain section of a speech recording to process. Each guide may then tag relevant chunks of text within their assigned section of the recording. The system may then combine information from multiple guides to determine a task and a digital representation of the task as the multiple guides are working in parallel. In some examples, multiple guides working in parallel may greatly reduce the response time for a user. For instance, a user may give instructions to send an email within a five minute speech segment. By having a number of guides process different sections of the speech segment in parallel, a draft email may be generated in far less time than it would take a single guide to listen to the entire five minute recording. In additional examples, different tasks or parts of the process may be distributed across multiple guides as well or instead.

In some examples, one or more separate editor guides may review and correct information across several sections of text handled by different guides. For instance, the editor guide(s) may be presented with a separate editor guide user interface that may allow the editor guide(s) to correct errors resulting from missing context information across separate sections of the recording. Additionally, the editor guide(s) may also be able to make other adjustments using an editor guide user interface as well, such as to correct errors in transcription, tagging, semantic labeling, or within a digital representation of the task.

II. HYBRID AUTOMATED AND HUMAN RESPONSE SYSTEMS

FIG. 1 is a block diagram illustrating components of a system 100, in which an example embodiment may be implemented. System 100 includes a Hybrid Automated and Human Response System 101 (which may be referred to simply as a "hybrid response system"), client devices 102A and 102B, and one or more communication networks 104.

A client device such as client device 102A or 102B may take various forms, such as a mobile phone, a tablet computer, laptop computer, a desktop computer, a head-mountable device (HMD) or a wearable computer (e.g., a smartwatch), among other possibilities. In the illustrated example, client device 102A is a smartwatch, and client device 102B is a smartphone. Further, client devices 102A and 102B may be configured to communicate with other devices via one or more communication networks 104 via respective communication links 103A and 103B.

Provided with network connectivity, a client device 102A or 102B may communicate with an hybrid response system 101. Further, client devices 102A and 102B may each be configured to receive voice input, and to generate or extract speech segments from the voice input. Further, client devices 102A and 102B may send potentially-actionable-speech messages, which include such speech segments, to hybrid response system 101 via one or more networks 104, such as the Internet, a cellular network, and/or a service provider's network.

Note that herein, the term "speech segment" may refer to an audio segment that includes speech by a user of a client device 102A or 102B, or to the speech-to-text transcription of such speech, or possibly to a combination of an audio segment with speech and a speech-to-text transcription of such speech. Thus, a potentially-actionable-speech message may include an audio segment that includes speech by a user of a client device 102A or 102B, and/or may include a speech-to-text transcription of the speech in such an audio segment. A potentially-actionable-speech message may also include other information, such as context information related to the client device and/or a user-account that is currently associated with the client device, for instance.

A client device 102A or 102B may provide various interface features that allow a user to interact with a hybrid response system 101. For instance, an HMD may allow a user to provide an explicit indication that the user is about to provide speech that should be sent to the hybrid response system 101 in a potentially-actionable-speech message. As an example, when the user taps and holds a touchpad on HMD, and subsequently speaks, the subsequent speech may be captured as a speech segment and sent to the hybrid response system in a potentially-actionable-speech message. Note that in this example, the HMD may be configured to record speech after the user removes their finger from the touchpad, or may capture speech that occurs while still the user holds their finger on the touchpad. Client devices 102A and 102B may also be configured to detect speech segments for potentially-actionable-speech messages without explicit input from the user; for example, by detecting words, a phrase, or phrases in speech that are deemed to be potentially actionable.

In an example embodiment, the components of hybrid response system 101 include an automated response system 106 and guide computing systems 108A to 108C. Hybrid response system 101 and/or the components thereof may be implemented in one or more computing clusters that are associated with an information-provider service. For example, the automated response system 106 may include one or more computing systems that are configured to receive potentially-actionable-speech messages that are sent by client devices, and to analyze and potentially respond to such messages.

In a further aspect, automated response system 106 may apply one or more machine-learning response processes to a speech segment, in order to determine one or more potential responses to the speech segment. (Note that a machine-learning response process may also be referred to as an artificial intelligence (AI) process.) A potential response that is generated by such an AI response process may be considered an "automated" response, since it is generated by a computing system, without the assistance of human input. Note that other automated response process, which do not involve AI or machine-learning, are also possible.

Automated response system 106 may be further configured to determine a confidence measure for each potential response that is generated by an automated response process. Further, automated response system 106 may be configured to determine if the confidence measure for a potential response satisfies certain criteria (e.g., exceeds a threshold) and, if the criteria are satisfied, to select the potential response as a response to the actionable-speech message. Further, when there is acceptable confidence in an automated response, automated response system 106 may be configured to send the automated response to the client device 102A or 102B from which the corresponding actionable-speech message was received.

If automated response system 106 cannot determine an automated response to a potentially-actionable-speech message with an acceptable level of confidence, then automated response system 106 may be configured to send the potentially-actionable-speech message, and/or a message containing information derived therefrom, to one or more guide computing systems 108A to 108C. Note that automated response system 106 and guide computing systems 108A to 108C may be part of a service provider's network, and may communicatively connected via wired or wireless links. Alternatively, some or all guide computing systems 108A to 108C may not be part of the service provider's network. For example, third party individuals who are pre-qualified as guides may connect to automated response system 106 via their home computers. In such an embodiment, automated response system 106 and guide computing systems 108A to 108C may communicate via one or more networks 104, such as the Internet and/or a cellular network.

Each guide computing system 108A to 108C may provide an interface via which a human can provide input. Such human input may be used to generate a response to a potentially-actionable-speech message that was sent from a client device 102A or 102B.

For example, a guide computing system 108A to 108C may include or be connected to a graphic display on which the guide computing system can display a graphical user interface (GUI) that facilitates a human-assisted response to a potentially-actionable-speech message. Such a GUI may include the text of a speech segment and/or other information that may facilitate taking an action related to the speech segment. The GUI may include features that prompt and/or receive human input, such as text and/or speech, via which a human guide can provide a response and/or information that may be used to generate a response. The GUI may also include interactive features (e.g., buttons, check boxes, drop-down menus, etc.) via which a human guide can provide a response and/or information that may be used to generate a response. Further, the GUI may include an interactive feature or features via which a human guide can indicate that a response is acceptable and should be sent to the client device 102A or 102B.

In some embodiments, the GUI may include a feature or features that provide a guide with context information that a user has elected to make available via a user-account with the hybrid response system 101. For example, if a user has consented to use of certain information by the hybrid response system 101 (and associated human guides), such as location information, calendar information, contact information, information related to past interactions with contacts, and/or past use of certain applications, such information may selectively provided in the GUI when the user sends a potentially-actionable speech message from their client device, in order to assist a guide in providing a personalized response.

Further, in some cases, a user may link other user-accounts to the user's account with the hybrid response system 101. For example, a user could link their email accounts, social-network accounts, and/or other types of user-accounts, to their user-account with the hybrid response system 101. In this scenario, a user may elect to allow full or partial access to such accounts to the hybrid response system (and possibly to associated human guides as well). If the user elects to provide access to such a linked account, then the GUI may include information obtained via the linked user-account, and/or may include a feature that allows a guide to access the linked user-account.

Generally, note that in situations where the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In a further aspect of some embodiments, a guide computing system 108A to 108C may provide a GUI or another type of interface via which a human guide can send a communication to and/or establish a communication session with a client device 102A or 102B to which the guide is providing a response. For example, a guide computing system 108A to 108C may include an interface that allows a human guide to initiate a phone call to a client device 102A or 102B, initiate and/or engage in a text-based chat session with a client device 102A or 102B, send a text message (e.g., an SMS or MMS message) to a client device 102A or 102B, and/or send an e-mail to a client device, among other possibilities. Provided with such an interface, a guide may send a message or initiate a communication session to, e.g., request additional information to facilitate and/or improve the quality of a response.

In the illustrated example, communication links 103A and 103B are wireless links. For example, a client device 102A or 102B may establish and communicate via a respective communication link 103A or 103B using a wireless communication protocol, such as Bluetooth® radio technology, communication protocols described in IEEE 802.11 (including any IEEE 802.11 revisions), and/or cellular communication protocols (such as GSM, CDMA, UMTS, EV-DO, WiMAX, or LTE), among other possibilities. Note, however, that a client device 102A or 102B may additionally or alternatively be configured for network communications over one or more wired connections. For example, a communication link 103A or 103B may be a wired serial bus such as a universal serial bus or a parallel bus. A wired connection may be a proprietary connection as well, or may take other forms.

Variations on the system 100 illustrated in FIG. 1, and/or variations on the functionality attributed to components of system 100, are possible. For instance, multiple components may be combined in the same entity. As an example, a system may include more or less guide computing systems than shown in FIG. 1. Further, any component that is illustrated in FIG. 1 may be divided into two or more components that collectively provide the described functionality. Other variations from the illustrated examples are also possible.

Figure 2:
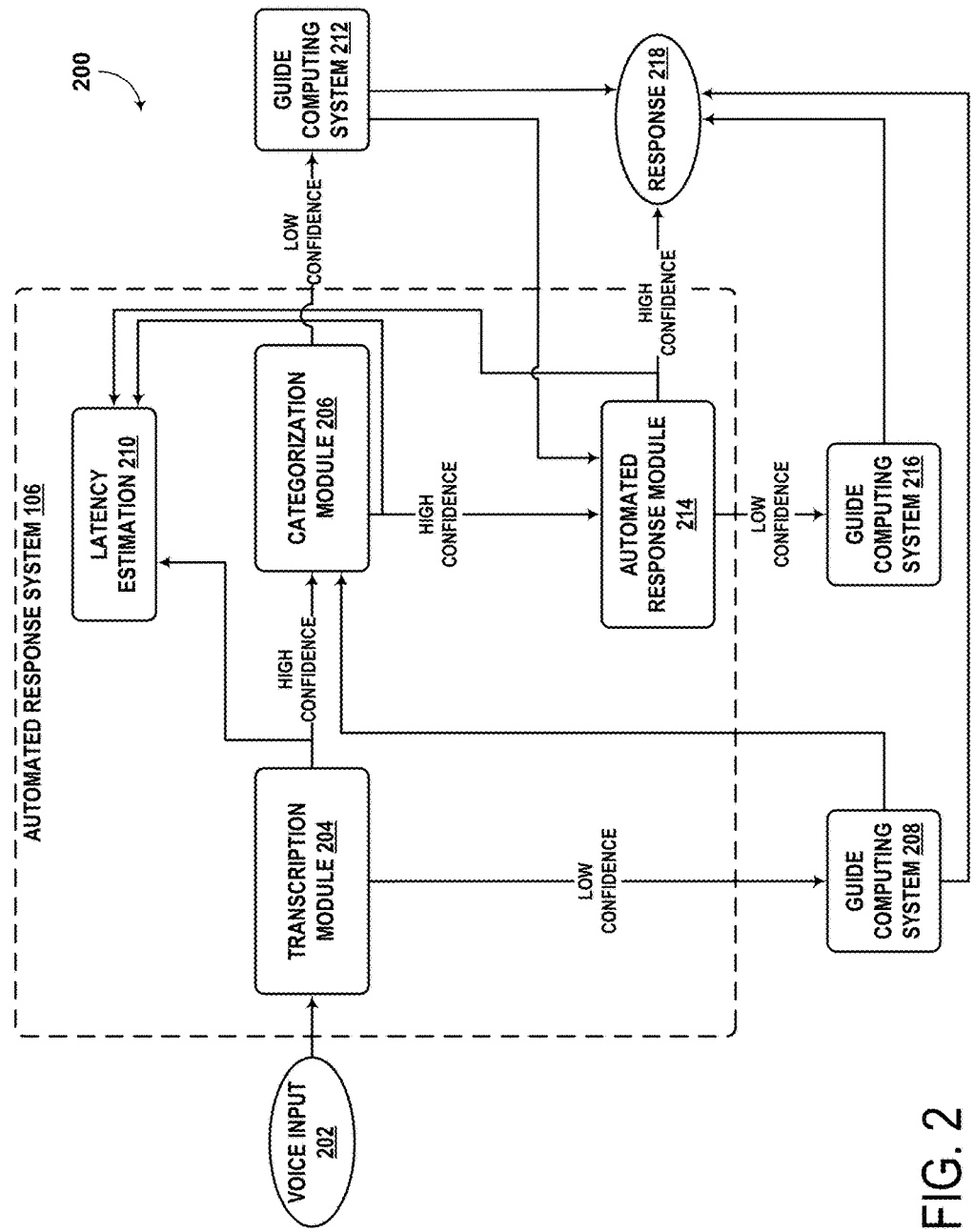
FIG. 2 is a block diagram showing functional components of a system, according to an example embodiment.

FIG. 2 is a block diagram showing functional components of a system 200, according to an example embodiment. Collectively, the components of system 200 may function to receive voice input (e.g., a speech segment), and to provide either an automated response or a human-assisted response to the question.

More specifically, voice input 202 may be received by a transcription module 204, which applies a speech-to-text process to generate text corresponding to the voice input 202. Further, transcription module 204 may analyze whether the corresponding text is an accurate transcription of the voice input 202. In some examples, the transcription module 204 may determine a translation confidence measure that indicates how likely it is that the corresponding text is an accurate transcription. If the translation confidence measure exceeds a threshold, then the transcription module 204 may send the generated text to a categorization module 206. If the translation confidence measure is lower (e.g., less than a threshold), then the transcription module 204 may send the text (and possibly audio data that includes some or all of the voice input 202) to a guide computing system 208. Further, in some embodiments, if the confidence measure is very low (e.g., indicative of audio that does not include human speech), the transcription module 204 may discard the text without taking any further action.

In other examples, a translation confidence measure may not be determined by transcription module 204 and/or a threshold may not be used to evaluate a translation confidence measure. Instead, the transcription module 204 may always send the text (and possibly other information) to the guide computing system 208 to assist in determining or refining the transcription of the voice input 202.

The guide computing system 208 may provide an interface that facilitates evaluation of the generated text by a human guide. In particular, such an interface may allow a human guide to indicate whether or not the text is an accurate translation. Further, such an interface may allow the guide to edit the text such that it is more accurate transcription of the voice input. In the event that a human guide indicates that the text is an accurate transcription, and/or edits the text such that it is an accurate transcription, the guide computing system 208 may send the text to categorization module 206. Additionally or alternatively, and regardless of whether the text is an accurate transcription, the guide computing system 208 may provide an interface that allows the human guide to indicate that the text does not include a question to which a response can be provided, and thus should be discarded instead of being sent to categorization module 206.

The transcription module 204 or the guide computing system 208 may thus be the component that outputs a potentially-actionable-speech message in which the speech segment includes text (and possibly an audio version of the text as well). As such, the transcription module could be implemented at a client device, or could be implemented as part of a service-provider's system. Alternatively, if the transcription module 204 is implemented as part of a service provider's network, the transcription module may receive and analyze a potentially-actionable-speech message that is sent from a client device. Further, the potentially-actionable-speech message may be sent to the categorization module 206 for further evaluation.

Categorization module 206 may analyze whether the received text includes speech to which a response can be provided (e.g., whether the speech segment is, in fact, "actionable"). In particular, the categorization module 206 may determine an actionable-speech confidence measure that indicates how likely it is that the text constitutes a question, a command, a request, or another type of message that is actionable. If the actionable-speech confidence measure exceeds a threshold, then the categorization module 206 may generate an actionable-speech message that includes some or all of the text, and send the actionable-speech message to an automated response module 214.

Note that actionable speech segments may take various forms. For example, an actionable speech segment may be a question, such as "where can I get lunch right now?" An actionable speech segment could also be a command or an instructions, such as "buy those shoes for me." An actionable speech segment may take other forms as well. Further, while an actionable speech segment could make the desired response explicit, responsive actions may also be inferred from the speech segment and/or context information related to the client device and/or user-account associated with the speech segment.

In a further aspect, categorization module 206 may classify an actionable-speech message in various ways. For instance, categorization module 206 may determine that a speech segment is of a particular type, relates to certain topic, and/or that providing a response to a speech segment in the message has a certain difficulty level, among other possibilities. Accordingly, such classifications may be indicated in an actionable-speech message that is sent to automated response module 214.

If the actionable-speech confidence measure is lower (e.g., less than a threshold), then the categorization module 206 may send the generated text to a guide computing system 212. The guide computing system 212 may provide an interface that facilitates evaluation of the text by a human guide. In particular, the guide computing system 212 may provide an interface via which a human guide can indicate whether or not the text includes a question, and possibly edit the question such that it is more understandable. Further, the guide computing system 212 may provide an interface for classifying actionable speech segments in the same or a similar manner as a categorization module 206. Alternatively, once a human guide indicates that the text is actionable, the guide computing system 212 may send the text back to the categorization module 206, which may classify the speech segment and/or generate and send an actionable-speech message to automated response module 214.

Automated response module 214 may function to apply one or more automated processes to a given actionable-speech message, such as AI or machine-learning processes. Each automated process may output a response to the actionable-speech message, and a confidence score (i.e., a measure of confidence) indicating a confidence that the response is correct. If the confidence score for a response from one AI process is above a threshold at which the response is considered to be correct (e.g., greater than 99% confidence in the response), then this automated response may be selected as the response to the question, and sent to the corresponding client device.

Note that in some cases, there may be multiple responses having a confidence score that is above the threshold where the response is considered to be correct. In this scenario, one of the "correct" responses may be selected and sent to the client device. For example, the correct response having the highest confidence score may be selected, or one of the correct responses may be selected at random. As another example, automated response module 214 may send some or all of the correct responses to a guide computing system 216 for evaluation by a human guide, who can then select one correct response. Other techniques for selecting a response from multiple correct responses are possible.

If no automated response to an actionable-speech message has a confidence score above the threshold for a "correct" response, then automated response module 214 may forward the actionable-speech message to a guide computing system 216. The guide computing system 216 may present the speech segment from the actionable-speech message and/or other information included in or derived from the actionable-speech message to a human guide. Further, guide computing system 216 may provide an interface that allows a human guide to indicate a response, provide information from which a response may be generated, and/or initiate a responsive action.

In some embodiments, automated response module 214 may evaluate the confidence score or scores for automated responses in a more granular way. For instance, automated response module 214 may classify responses with one of three confidence levels: a high-confidence level (e.g., greater than 99% confidence), a medium-confidence level (e.g., 80-98% confidence), and a low-confidence level (e.g., less than 80%). If one or more automated responses are categorized as high-confidence responses, then automated response module 214 may initiated an automated response.

If there is no high-confidence automated response, then the information that is sent to the guide computing system may vary depending upon the confidence level or levels of the automated responses. For example, if all the automated responses have a low confidence level, then automated response module 214 may simply send the actionable-speech message to a guide computing system 216. However, if some or all of the automated responses have a medium-confidence level, then automated response module 214 may send the actionable-speech message and the medium-confidence responses to the guide computing system 216. The guide computing system 216 may then provide an interface that allows a human guide to quickly select one of the medium-confidence responses as the correct response. Such an interface may also include features that allow a guide to provide a response as they otherwise would, if the guide believes that none of the medium-confidence responses are correct.

Note that the feature of forwarding automated responses to guide computing systems may be applied in implementations other than those described above. In particular, when automated response module 214 determines that a guide computing system 216 should make the ultimate decision as to the correct response, automated response module 214 may send any response that was determined by one of its AI processes to the guide computing system 216 for consideration by a human guide. In order to facilitate a quicker response, automated response module 214 may limit the number of automated responses that are sent to the guide computing system 216 for consideration. However, automated response module 214 could theoretically send any number of automated responses to a guide computing system 216 for consideration.

Note that a response 218 may take various forms. For example, response 218 may be content that is sent to a client device associated with the actionable-speech message. Such a response 218 may include text, hyperlinks, graphic content, and/or other types of information that can be presented on a client device. A response 218 may also be a responsive action. For example, an AI process or guide computing system may response to an actionable-speech message by purchasing items via an associated user-account, or posting a message via an associated account on a social network (presuming, in both cases, that the user has authorized such functionality). Other examples of responsive actions are also possible. Further, note that depending upon a user's settings, the user may or may not be notified explicitly (e.g., via e-mail or text message) of such responsive actions.

In a further aspect, automated response module 214 may receive feedback from guide computing systems 208, 212 and/or 216, which may be used to improve the AI processes that are applied to incoming actionable-speech messages. Machine learning processes may then be applied to such feedback, so that the AI processes may improve over time. Note that as such AI processes improve, this may free up human guides to respond to more and more complex questions.

Automated response module 214 may use various types of feedback to improve the one or more AI processes that are applied to incoming actionable-speech messages. For example, when an actionable-speech message is sent to a guide computing system 216, automated response module may be informed of the human-assisted response that was sent to the client device and/or the steps that the human took to determine the response. As another example, each time an automated response is sent to a guide computing system 216 for consideration, automated response module 214 may be informed as to whether or not the automated response was selected as the correct response. As yet another example, when a client device receives an automated response from automated response module 214 or a human-assisted response from guide computing system 216, the client device may send feedback indicating the quality of the response. For instance, feedback from a client device may indicate whether the response provided information they needed, whether or not the response was correct, whether a better response could have been provided, and/or information that might improve future responses to similar questions, among other possibilities.

In a further aspect, system 200 may include a latency estimation module 210. The latency estimation module 210 may evaluate questions and estimate how long it will take for a response to be provided to a client device. Latency estimation module 210 may therefore be configured to send an estimated response-time message to a client device that is awaiting the response. The estimated response time message may indicate an estimated period of time (e.g., 30 seconds) until the client device will receive a response to a question that was sent from the client device. Further, while a client device is awaiting a response, latency estimation module 210 may update the estimated response time, and send estimated response-time message indicating such updates, as new information is received.

In order to estimate and/or update the estimated response time, latency estimation module 210 may receive information from transcription module 204, categorization module 206, automated response module 214, guide computing systems, and/or other sources. For example, latency estimation module 210 may increase or decrease an estimated response time for a actionable-speech message depending on: (a) whether the transcription module 204 has a lower or higher confidence in a transcription, respectively, (b) whether the categorization module 206 has a higher or lower confidence that the received text is actionable, (c) the complexity of the speech segment and/or the type or category of speech segment (e.g., as determined by categorization module 206), and/or (d) whether or not automated response module can provide an automated response with a high enough level of confidence, among other possibilities.

Note that some or all of guide computing systems 208, 212, 216 may be the same guide computing system. Alternatively, different guide computing systems may be utilized for some or all of the guide computing systems that may be involved in providing a response to a particular actionable-speech message.

Further, in some embodiments, all of the modules shown in FIG. 2 may be part of an automated response system 106. In other embodiments, some of the modules shown in FIG. 2 may be implemented at a client device 102A or 102B. For example, transcription module 204 and/or categorization module 206 may be implemented by a client device. Other examples are also possible.

III. EXAMPLE SYSTEM WORKFLOWS

Figure 3:
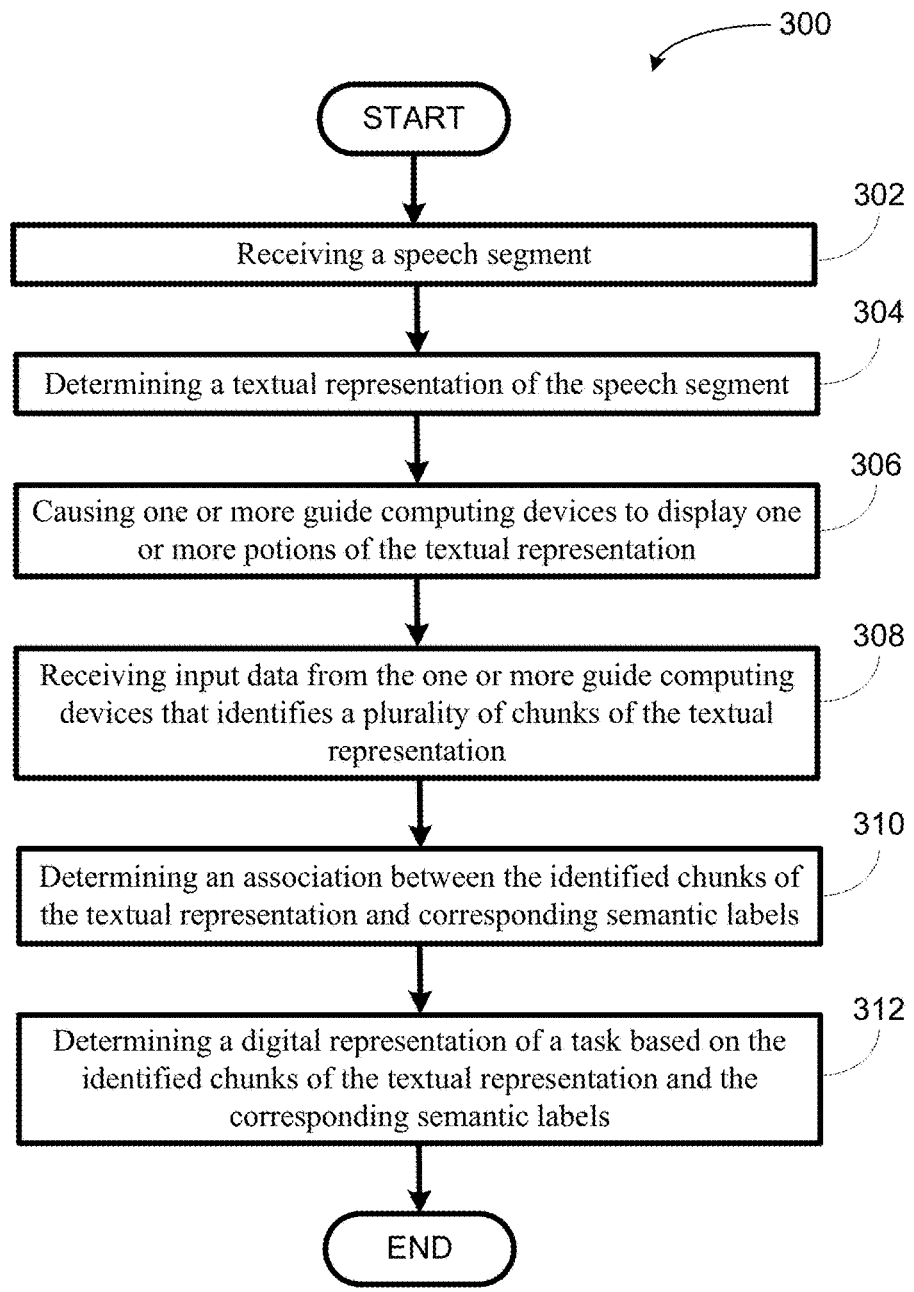
FIG. 3 is a flowchart illustrating a method, according to an example embodiment.

FIG. 3 illustrates a flowchart showing a method 300, according to an example embodiment. More specifically, method 300 may be used to generate a digital representation of a task based on verbal instructions, such as to send an email. In some examples, method 300 may be carried out by a computing system, such as hybrid automated and human response system 101 as described in reference to FIG. 1. Further, part or all of method 300 may be carried out by one or more guide computing devices, which may be configured to communicate with an automated response system. Additionally, in some examples, part or all of method 300 may be executed by a user device that receives a verbal command from a user, such a wearable computing device (e.g., a smartwatch or an HMD), or a cellular phone.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may involve receiving a speech segment. The speech segment may come in the form of a question, a request, or a command, among other possibilities. In some examples, the speech segment may indicate a task to perform (e.g., a desired action or output), such as to send an email, record notes in a note-keeping application, or generate directions to a target location on a map. In further examples, the speech segment may be received over time or in separate sections. For instance, a first section may be received for processing before the user has completed speaking the entire speech segment. In additional examples, the received speech segment may include an audio recording, a transcription of the speech segment to text, or both.

Figure 4:
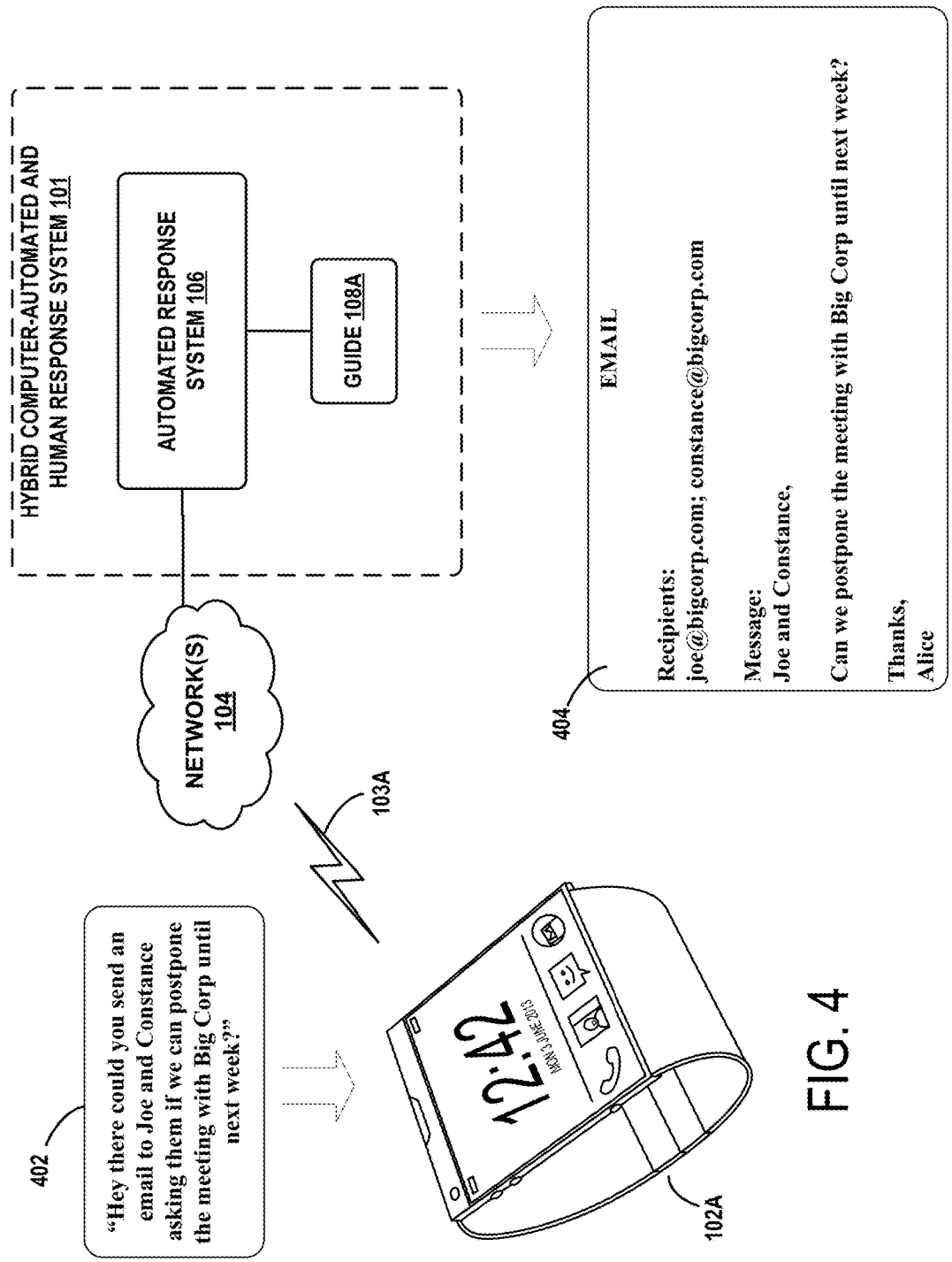
FIG. 4 is a block diagram illustrating example system workflow, according to an example embodiment.

To illustrate, FIG. 4 shows a client device 102A, a hybrid response system 101, and an email 404 generated from speech segment 402, according to an application of an example embodiment. In particular, FIG. 4 illustrates a scenario where a user of client device 102A requests through a verbal command 402 that an email be sent to particular target recipients (Joe and Constance) to ask them if a meeting with a company named Big Corp can be postponed to the next week. Upon identifying the spoken request, the client device 102A may forward the speech segment 402 to the hybrid response system 101 via network 104 using link 103A.

The hybrid response system 101 may then receive the speech segment 402 for processing via network 104. In some examples, the speech segment 402 may be processed by an automated response system 106 in conjunction with a guide computing device 108A. A single guide is illustrated for purposes of this example, but multiple guides may be involved in processing requests as well. Within examples, the hybrid response system 101 may generate a digital representation of an email 404 based on the speech segment 402. In particular, different sections of an email template such as the recipients and message body may be filled in based on content from the speech segment 402. Additionally, the email 404 may be composed by hybrid response system 101 to add relevant personal information such as the sender's name or the target recipients' email addresses. In some examples, the hybrid response system 101 may cause the email 404 to be sent to the target recipients. In other examples, the hybrid response system 101 may instead determine a representation of the email 404 (e.g., a draft of the email for review by a user before sending).

Referring back to FIG. 3, method 300 may additionally involve determining a textual representation of the speech segment, as shown by block 304. More specifically, a textual representation of the speech may be determined using an automated system and/or human guide assistance. In some examples, a transcription may be determined using a transcription module, such as illustrated and described with respect to FIG. 2. In additional examples, part or all of the transcription may be received along with the speech segment. For instance, an ASR recognition system may preprocess the audio content to determine some or all of the text. In another example, the user of the client device may provide some or all of the textual representation as well.

In further examples, part or all of the transcription may be determined based on input from one or more guide computing devices with guide user interfaces presented to one or more human guides. In some examples, a guide user interface may play a portion of the audio segment, and then receive text typed by a guide identifying words in the played audio content. In additional examples, the transcription may be automatically adjusted to appear in an appropriate form (e.g., by correcting tense, punctuation, relative references, etc.). In other examples, a guide user interface may display text generated using ASR processes, and then provide an interface to allow guides to manually fix parts of the text conversion (e.g., by editing or retyping certain parts). In some examples, the guide user interface may be designed to facilitate rapid corrections to encourage guides to move forward through an audio recording quickly to keep latency down.

FIGS. 5A, 5B, 5C, and 5D collectively illustrate examples of a guide user interface, according to an example embodiment. In reference to FIG. 5A, a guide user interface 500 may include a waveform representation 502 of a speech segment. Additionally, the interface 500 may include text 504 that is automatically determined using ASR, with the individual words placed into position according to timestamps automatically obtained. In one example, as audio speech is played back via guide user interface 500, each word may be highlighted. When a word is highlighted, the word may be changed by a guide by typing an alternative or deleting the word by pressing backspace. In some examples, suggestions may be given to a guide when typing/correcting words based on words identified by an ASR processor, words within a user's personalized dictionary, and/or based on a general word list.

In further examples, the rate of audio playback may be dynamically adjusted based on word density to maintain a consistent word rate. In particular, the audio recording may be automatically slowed down in areas with high word density and sped up in areas of low word density. For instance, as a specific example, the playback rate may be adjusted so that the guide receives one word roughly every half a second. In some examples, adjusting playback rate based on speech content may allow a guide to process a segment of speech in less time than it took for a user to speak the segment (e.g., when the user inserts long pauses between words). In further examples, other aspects of the audio playback may be adjusted along with the rate, such as for pitch correction.

In additional examples, guide user interface 500 may additionally include a playback controller 506 that indicates where the content currently being played back fits chronologically within a speech segment. Additionally, separate controls 508 may allow a guide to navigate forward or backward within an audio segment to skip or repeat certain sections. In further examples, a guide may also be able to navigate (e.g., using the left and right arrow keys) between different words in the text 504 to make corrections to the transcription. As the guide navigates between words, the audio playback may be automatically synced to those areas. In such examples, the playback controller 506 and/or the control buttons 508 may optionally be omitted from guide user interface 500. In further example, a separate command (e.g., pressing the control key and the left/right arrow keys) may allow the guide to skip forward or backward by a certain fixed time period.

Referring back to FIG. 3, method 300 may further involve causing one or more guide computing devices to display one or more portions of the textual representation, as shown by block 306. In particular, whether the transcription of the speech segment is determined solely using ASR, solely based on typed input from human guides, or based on a combination of the two, portions of the textual representation may be presented within the guide user interface in a format that facilitates selection of text and possibly other input actions by a human guide. For instance, in reference to FIG. 5A, as the transcription is determined, it may be displayed or updated as text 504 in order to allow a guide to select parts of text as the audio is played back.

Method 300 may further involve receiving input data from the one or more guide computing devices that identifies a plurality of chunks of the textual representation, as shown by block 308. More specifically, a guide may select chunks of text or boundaries between chunks of text via a guide user interface that represent semantically consistent pieces of information, such as names, places, or sections of prose. These chunks of text may be complete and separate pieces of information that may be used by a computing system, such as automated response system 106 as described with respect to FIG. 1, to understand the task requested by the user. One or more human guides may therefore facilitate automated parsing of a speech segment. Additionally, the guide user interface may be designed to allow the guide to quickly select relevant chunks of text for the task as the audio recording is played back and/or during transcription or correction of the transcription.

Figure 5A:
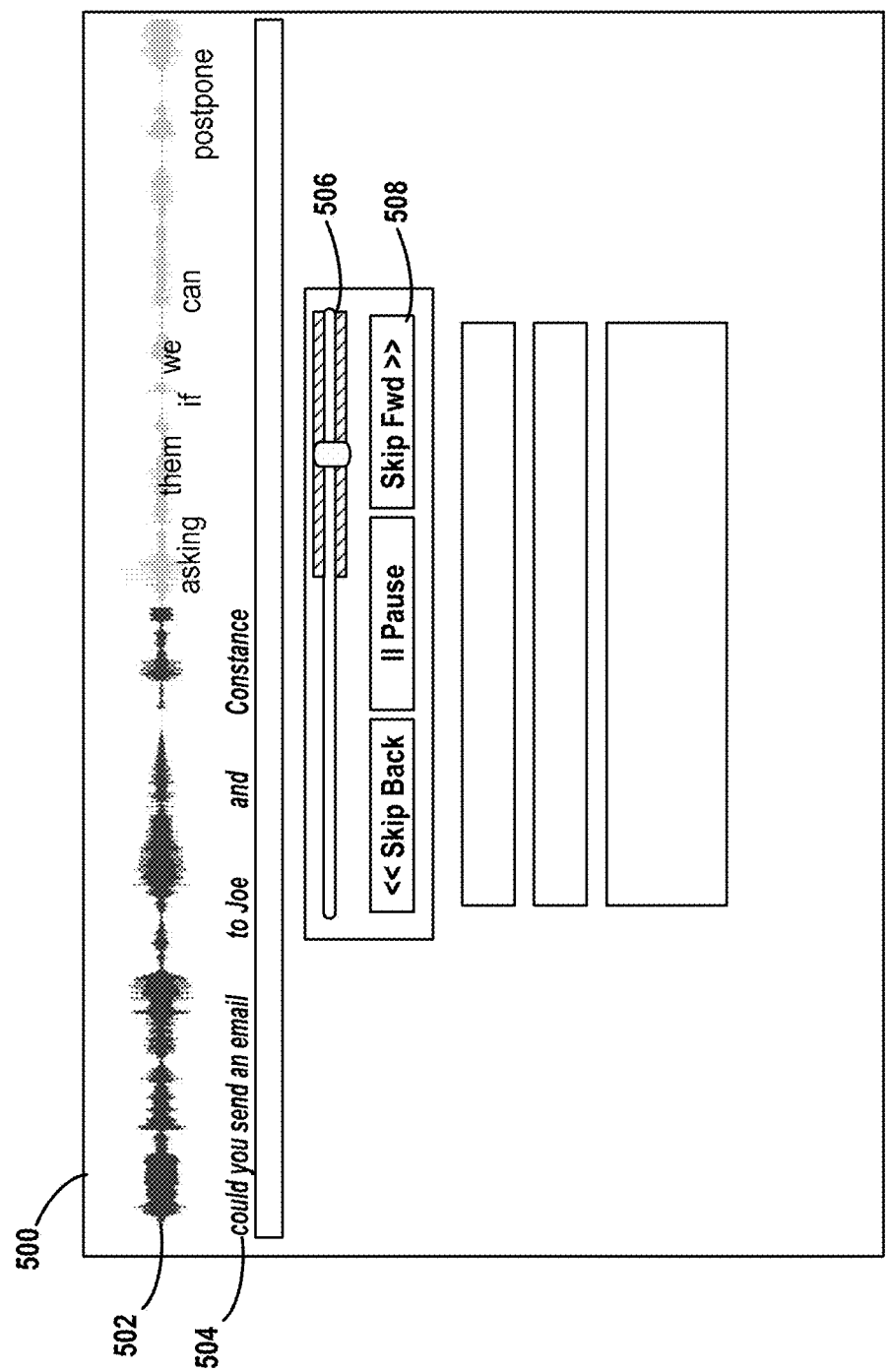
FIGS. 5A, 5B, 5C, and 5D illustrate examples of a guide user interface, according to an example embodiment.
Figure 5B:
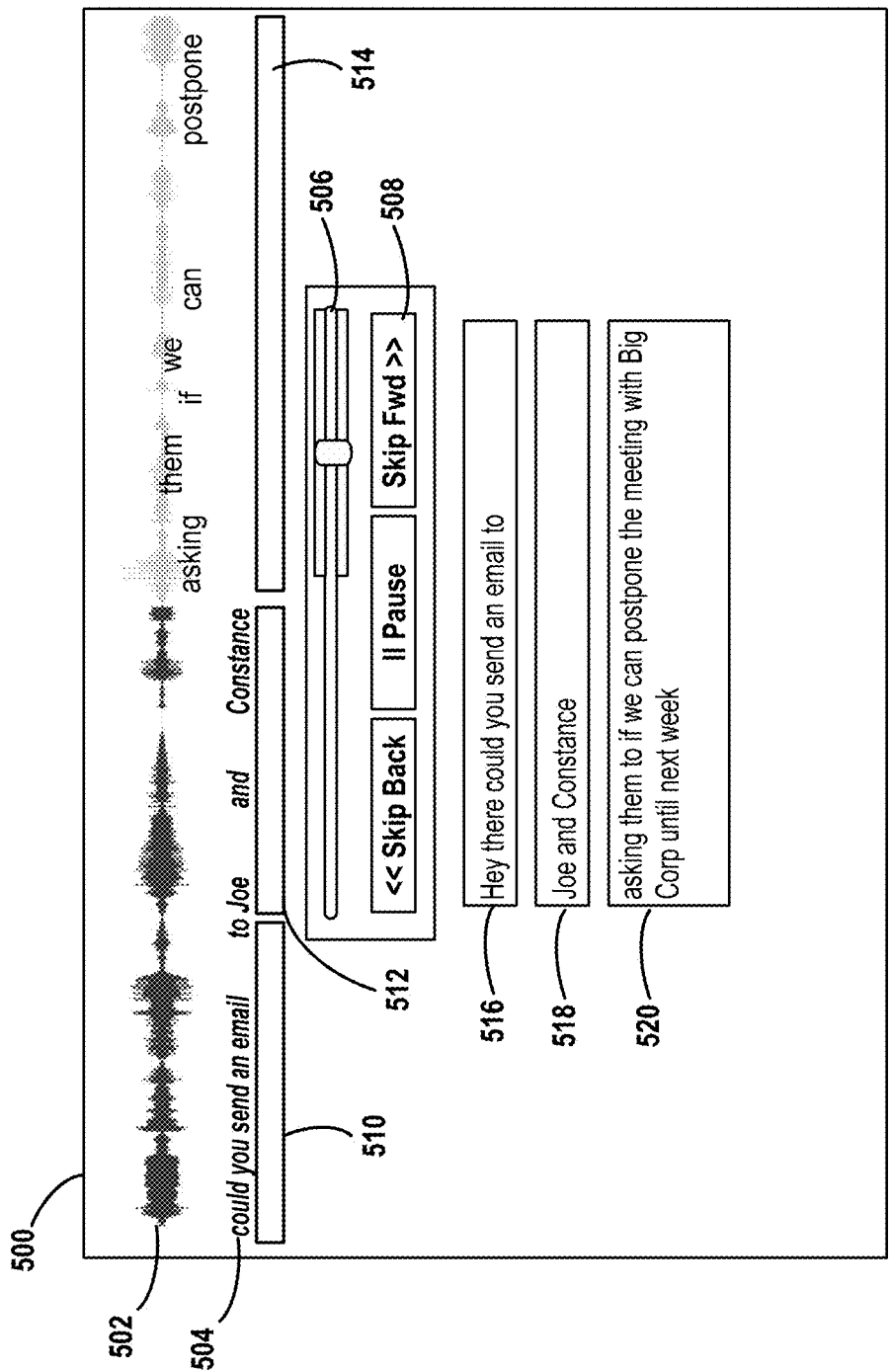

FIG. 5B illustrates a further example of a guide user interface that illustrates separate chunks of text from a speech segment, according to an example embodiment. In particular, guide user interface 500 may facilitate breaking the textual representation 504 of an audio recording into separate chunks representing different types of information. For purposes of illustration, the user interface for breaking the text into chunks is illustrated as being combined with the transcription interface, but different interfaces for each stage could be used, possibly by different guides operating in parallel.

In reference to FIG. 5B, a first chunk 510 may be selected by a guide that represents context information. In particular, the text within chunk 510 may be used by an automated system to identify the type of task to perform (e.g., to send an email), but the text itself may not be used as part of the email. Additionally, a second chunk 512 may be selected by a guide that represents relevant people. In particular, the names within chunk 512 may be used by an automated system to identify people as relevant to a particular aspect of a task (e.g., as target recipients for an email). In some examples, a human may be able to more easily differentiate between names that require processing (e.g. target recipients) from names that don't require specific processing (e.g., names to be described in the body of an email) than an automated system without human assistance. Furthermore, a third chunk 514 may be selected by a guide that represents prose to be used as part of the task. For instance, an automated system may identify the text within chunk 514 to be used as part of the body of an email to send.

The guide user interface 500 may facilitate breaking the text into chunks using a variety of input methods, including keyboard shortcuts or selections with a pointing device. In further examples, the tagging interface may be designed to facilitate guide operation while minimizing the need for pausing or rewinding. For instance, identified chunks may automatically "snap" to word boundaries based on the transcription.

In additional examples, the text associated with each chunk of text may be automatically populated in separate text boxes within an editing area of guide user interface 500. In reference to FIG. 5B, the text within chunk 510 may be copied to text box 516, the text within chunk 512 may be copied to text box 518, and the text within chunk 514 may be copied to text box 520. The text boxes 516-520 may then be used by a guide to further refine the identified chunks of text. For example, individual chunks may be split into separate chunks, merged into fewer chunks, or the boundaries between chunks may be moved left or right via guide user interface 500. In further examples, the text within the chunks may be edited by a guide and/or automated system to provide correctly formatted pieces of information to be used as parts of a task.

In further examples, chunks of text may also be marked using certain directive tags to indicate instructions to an automated system and/or to other reviewing guides. For instance, chunks of text may be marked as "ignore" within guide user interface 500 to indicate pieces that should be considered parts of the instructions to the response system and not part of the information needed to actually complete a task. As another example, chunks of text may be marked as requiring correction to indicate further investigation by an automated system or another guide may be needed to process or understand certain pieces.

In additional examples, chunks of text may represent many other types of information, depending on the task requested. For instance, a task could involve giving a user directions on a map. In that case, the chunks of text identified by a guide using a guide user interface may include destinations, routes to take, preferred modes of transportation, scheduling constraints, and so on. Other types of tasks may be processed in different examples as well.

Referring back to FIG. 3, method 300 may additionally involve determining an association between the identified chunks of the textual representation and corresponding semantic labels, as shown by block 310. In particular semantic labels may be determined that describe the pieces of information within chunks of the textual representation. For instance, possible semantic labels include context, prose, title, people, or place. In some examples, an automated system may attempt to automatically determine semantic labels based on the text within each chunk. For instance, if the text appears to be a name or email address, the automated system may recognize the text and label it the area as such.

Figure 5C:
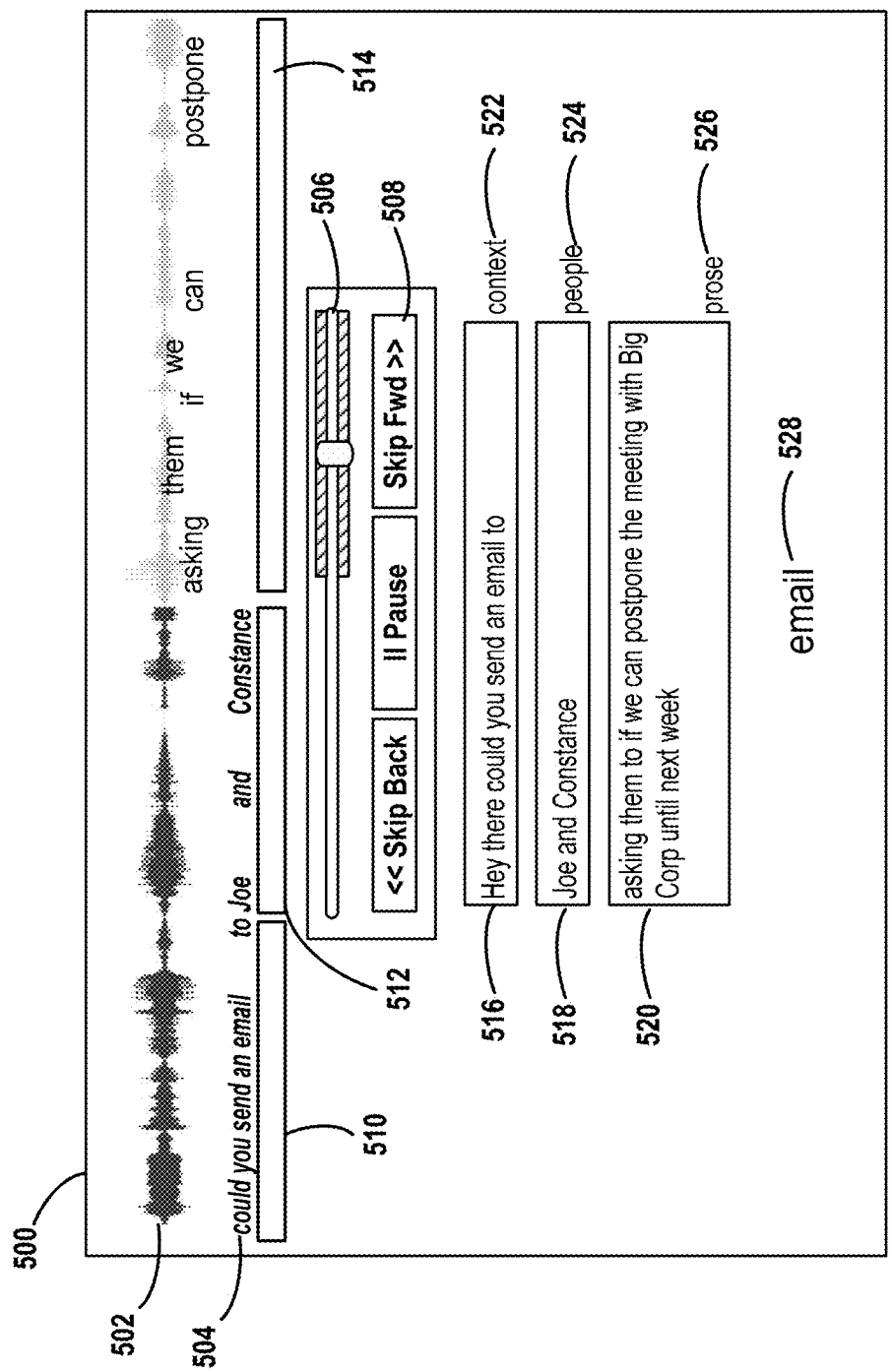

FIG. 5C illustrates a guide user interface with identified chunks of text and corresponding semantic labels, according to an example embodiment. More specifically, the chunk of text within text box 516 may be identified by an automated system as context 522, indicating that this text describes information about the type of task rather than content for the task. Additionally, the chunk of text within text box 518 may be identified as people 524, indicating that the text within text box 518 describes names of people relevant to execution of the task. Further, the chunk of text within text box 520 may be labeled as prose 526, indicating that the text within text box 520 contains prose to be used as content for part of the task. Additionally, the computing system may also use the chunks of text 516-520 and the corresponding semantic labels 522-526 to determine or guess that the requested task is to send an email 528.

In further examples, guides may be able to verify and correct autonomously determined semantic labels using guide user interface 500. Accordingly, the guide computing devices may provide constraints that an automated response system won't violate in determining labeled chunks of text and task information. In other examples, the guides may provide one or more of the semantic labels. In particular, a guide may be provided with a few possible annotations intended to help an automated system disambiguate task information. For instance, the guide may be provided with a flag to identify where the computer should look to determine the type of task, and a separate flag to identify content to execute the task. Other types of guide annotation options are also possible.

In additional examples, the step of determining semantic labels may be completed in parallel with transcription and/or breaking the text into chunks. Moreover, the completion of the task itself may be done in parallel with the label processing by autonomously figuring out what content is being used by the guide(s) to fill which fields (e.g., in an email form). For instance, a hybrid response system may involve one or more guides working in parallel with an automated response system. Each time a guide provides input via a guide computing device such as to identify a chunk of text or correct a semantic label, the automated response system may reinterpret and update automatically determined semantic labels and/or task information. For instance, a guide may identify a chunk of text representing a phone number, and the computer may automatically label the text as a phone number and guess that the desired task is to send a text message. In some cases, the autonomous system may also send the text message. Accordingly, the system may function as a collaborative process in which the automated system and the guides may continue to work on processing a request without having to wait on other parties.

Referring back to FIG. 3, method 300 may further involve determining a digital representation of a task based on the identified chunks of the textual representation and the corresponding semantic labels, as shown by block 312. In particular, the labeled chunks of text may be combined to produce output representing a requested task. In some examples, the chunks may be placed within a separate template corresponding to a task that the automated system identifies as the requested task. In further examples, the digital representation of the task may include a visualization of the task within a guide user interface, which may optionally be editable by one or more guides. For instance, an email template with relevant sections filled in may be displayed on a guide computing device before the email is sent. In other examples, the digital representation of the task may include actual execution of the task (e.g., sending a requested email) as well or instead.

In order to identify the type of task requested, an automated system may consider what tasks are possible given the constraints set up by the available identified chunks of text and corresponding semantic labels. In some cases, the requested task may be identified from a predetermined list of possible tasks. For instance, if the semantic labels include an email address and a chunk of prose, then the task may be identified as an email or draft email. If a location is identified, then the task may be identified as a request for directions. If the semantic labels include a title and a noun phrase, then the task may be identified as a digital note taking request. Other types of tasks are also possible.

In further examples, once an automated system identifies a task or a possible task, the system may display a name of the task within a guide user interface. For instance, in reference to FIG. 5C, the task may be identified within guide user interface 500 as an email 528 based on the chunks of text 516-520 and semantic labels 522-526. In some examples, the guide may be able to modify or correct the task within the guide user interface 500. The guide may also supply the task identification instead of the automated system in certain examples, as well.

Figure 5D:
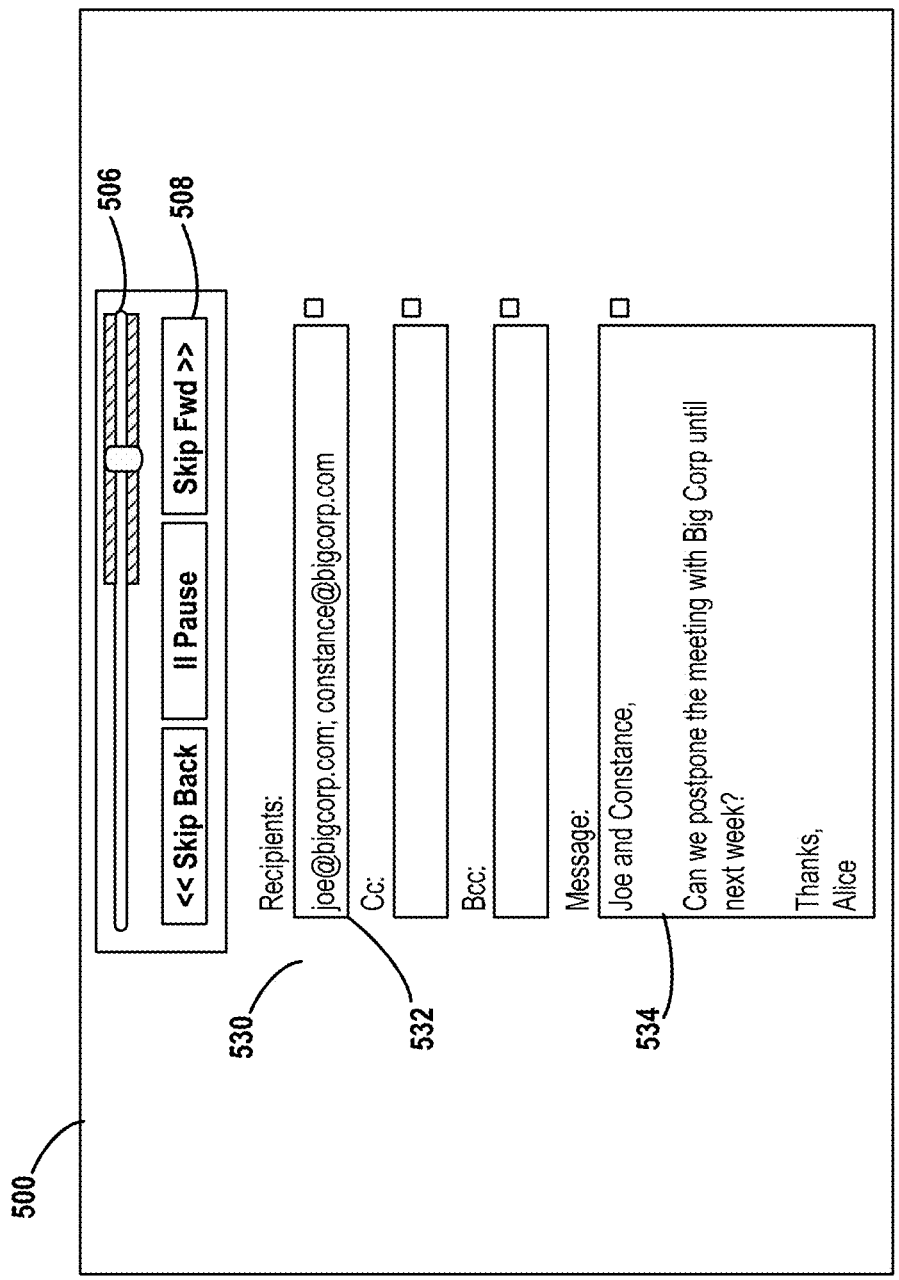

Once a requested task is identified, a digital representation of the task that incorporates information within the identified chunks of text may be determined. FIG. 5D illustrates an example guide user interface containing a digital representation of a task, according to an example embodiment. In particular, guide user interface 500 may include an email template 530 representing the requested email to be sent. The email template 530 may be selected from a number of possible templates corresponding to different types of tasks, and then identified chunks may be inserted into sections of the selected template. In some examples, the digital representation of the task may be displayed within the same guide user interface as the interfaces for transcription, breaking text into chunks, and/or semantic labeling. In other examples, a separate guide user interface may include the digital representation of the task to allow a different guide to edit or revise its content. More generally, the system may include multiple parallel guide roles that each contribute to completion of the task (and possibly parsing information for the system to better understand and/or learn from). In further examples, the digital representation of the task may not be presented to guides at all. For instance, an email draft may be presented to a smartwatch user who requested the email to be sent, or the email may be composed and sent automatically.

In reference to FIG. 5D, a guide may be able to modify components of the email template 530, including the target recipients 532 or the content of the message 534, via guide user interface 500. A visual representation of the task may serve as visual feedback to a guide to ensure that a task has been composed correctly. In some examples, the identified chunks may need to be modified to provide a more formal message, fix errors (e.g., to remove "oh and tell them that" from a draft email body), or to fill in additional information (e.g., to add the correct signature block for the user who is sending the email). Depending on the task, different visual information may be displayed within a digital representation of a task as well or instead. For instance, if the request is for directions, the digital representation of the task may include a map with a route highlighted, which could be displayed to one or more guides and/or to a user requesting the directions.

According to various example embodiments, multiple guides may perform functions on guide computing devices in parallel to provide faster response time. In particular, a speech segment may be broken down into two or more segments (e.g., contiguous portions) that may each be handled by a separate guide. In some examples, each guide may then be responsible for fixing transcription, breaking the text into chunks, and adjusting semantic labeling for a different portion of the speech segment. In further examples, an automated system may collaborate with each of the guides in parallel to determine the requested task and a digital representation of the task. In additional examples, one or more editor guides may be provided with different editor guide user interfaces that allow editors to correct context errors between different guides as well as other errors, such as errors in the final output.

In some examples, a speech segment may be broken down into segments of roughly equal length to be handled by different guides in parallel. For instance, a six minute speech segment may be split into three contiguous segments of roughly two minutes each to be sent to three different guide computing devices. In further examples, an automated ASR processor may be used to identify efficient boundaries between the segments provided to different guides. For example, boundaries may be chosen to ensure that a word is not split in half by a boundary between segments sent to different guide computing devices. In further examples, boundaries may be chosen in other way as well, such as by looking for long pauses that may indicate the completion of a thought or sentence by a user who provided the speech segment.

Figure 6:
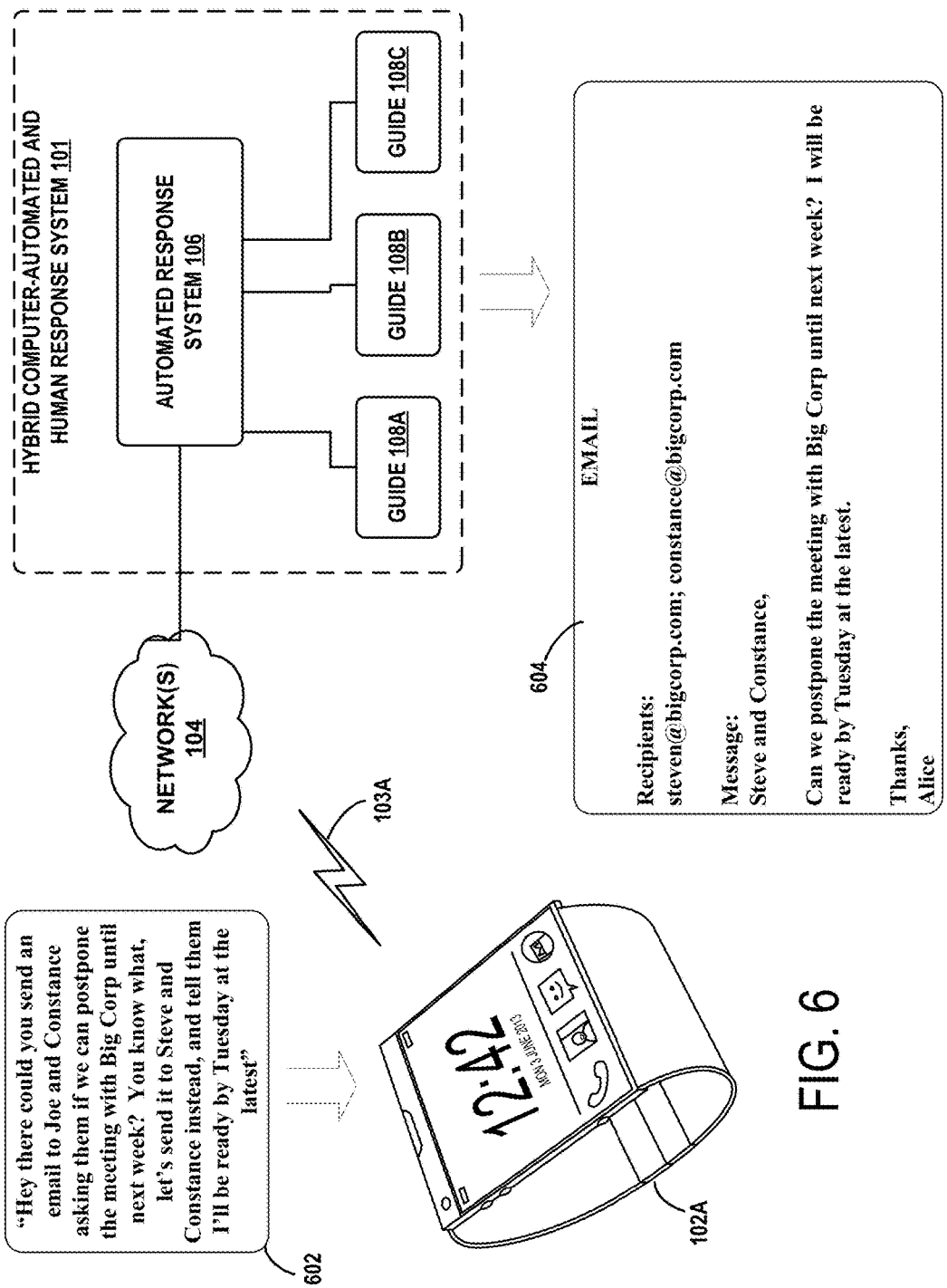
FIG. 6 is another block diagram illustrating example system workflow, according to an example embodiment.

To illustrate a system with multiple guides, FIG. 6 shows a client device (smartwatch 620), a hybrid response system 101, and an email 604 generated from speech segment 602, according to an application of an example embodiment. In particular, FIG. 6 illustrates a scenario where a user of smartwatch 102A requests that an email be sent through a verbal command 602 that is more complicated than the verbal command illustrated with respect to FIG. 4. Upon identifying the spoken request, the smartwatch 102A may forward the speech segment 602 to the hybrid response system 101 via network 104 using link 103A. As shown in FIG. 6, multiple guides 108A, 108B, and 108C may process the verbal command 602 partly or wholly in parallel to provide a faster response time than may result from using a single guide.

For instance, as one possible illustration, guide 108A and 108B may each be provided with roughly half of the speech segment. Each of guide 108A and 108B may then break the speech segment into chunks for semantic labeling within their assigned portion of the speech segment. Additionally, guide 108C may be an editor guide that reviews the resulting output from processing done by the automated response system 106 in collaboration with guides 108A and 108B. For instance, guide 108C may be responsible for verifying that there are no errors resulting from missing context across the sections handled by guide 108A and 108B, as well as any other errors in the final output. In some examples, guide 108C may be provided with a visual representation of the task incorporating input from each of guides 108A and 108B, such as an email template with sections filled in as shown by FIG. 5D. The guide 108C may then make sure the email maintains global context and may also fix any other errors before the email is sent. In some examples, guide 108C may perform functions that don't require guide 108C to listen to any or all of the audio recording. In further examples, roles may be split among guides 108A, 108B, and 108C in different ways as well.

Figure 7:
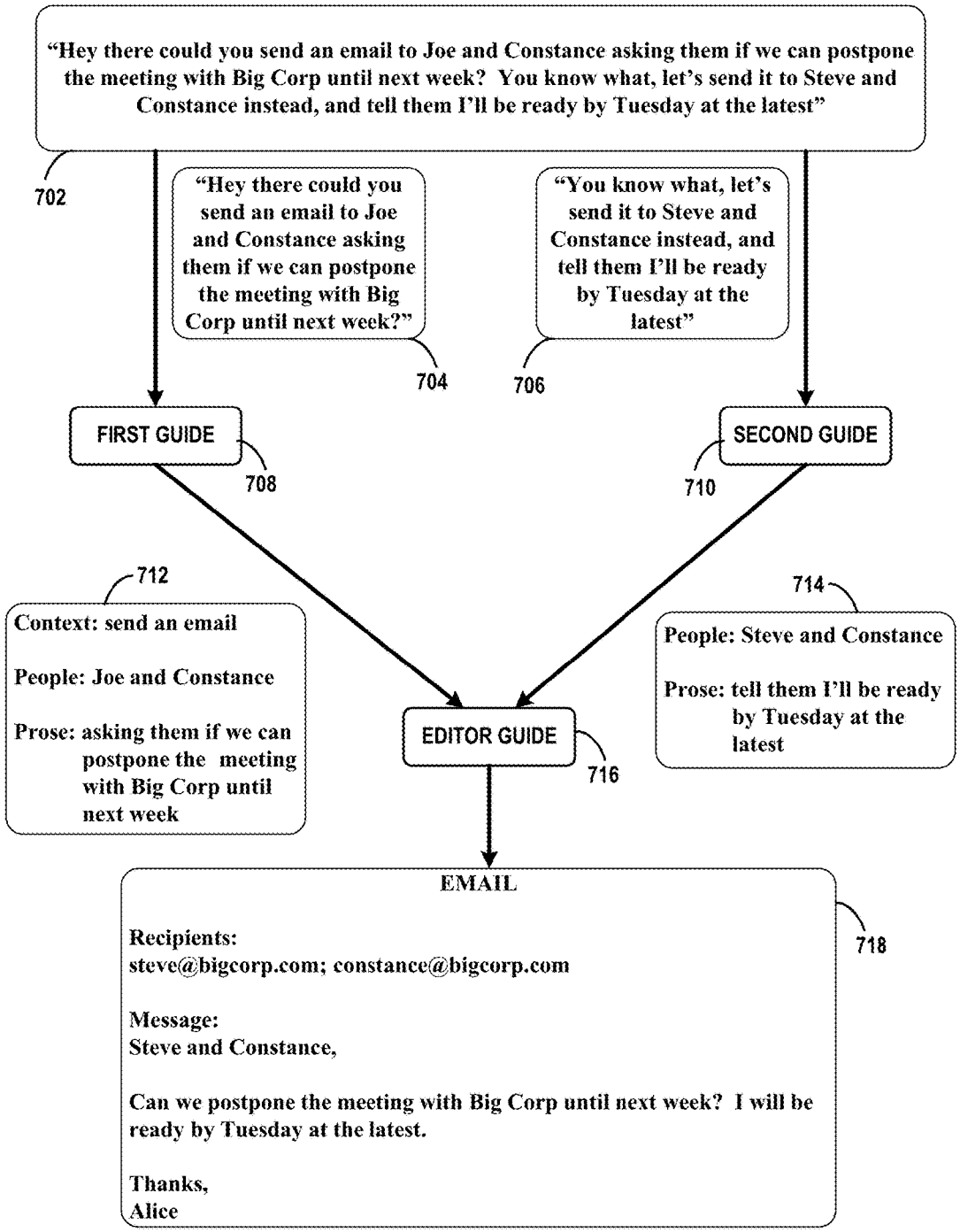
FIG. 7 is a flowchart illustrating example system workflow, according to an example embodiment.

FIG. 7 illustrates system workflow involving multiple guides, according to an example embodiment. More specifically, a speech segment 702 may be received from a user that includes a request for an email to be sent. In some examples, the speech segment 702 may be split into one or more portions and sent to different guide computing devices for processing in parallel. For instance, a first portion 704 of the speech segment 702 may be sent to a first guide 708, and a second portion 706 of the speech segment 702 may be sent to a second guide 710. The speech segment portions 704, 706 may be sent as audio recordings, as textual representations, or both.

The first guide 708 may then process the first portion 704 of speech segment 702 on a first guide computing device at the same time as a second guide 710 processes a second portion 706 of speech segment 702 on a second guide computing device. In particular, the first guide 708 may optionally produce or correct a transcription of the first portion 704 of speech segment 702. The first guide 708 may then break the first portion 704 into chunks to enable an automated response system to semantically label different chunks with different semantic identifiers. The first guide 708 may optionally provide or modify some of the semantic labels as well. The resulting output 712 from the collaboration between the first guide 708 and the automated response system may include identified chunks of the first section 704 of speech segment 702 and corresponding semantic labels. For instance, the output 712 may include a chunk that includes context information (e.g., identifying the task to perform as an email), a chunk that includes people (e.g., target recipients for the email), and chunk that includes prose (e.g., content for the email).

While the first guide 708 is processing the first portion 704 of speech segment, a second guide 710 may be sent a second portion 706 of speech segment 702. In particular, the second guide 710 may optionally produce or correct a transcription of the second portion 706 of speech segment 702. The second guide 710 may then break the second portion 706 into chunks to enable an automated response system to semantically label different chunks with different semantic identifiers. The second guide 710 may optionally provide or modify some of the semantic labels as well. The resulting output 714 from the collaboration between the second guide 710 and the automated response system may include identified chunks of the second section 706 of speech segment 702 and corresponding semantic labels. For instance, the output 714 may include a chunk that includes people and a chunk that includes prose. In some examples, the output 714 may additionally include one or more flags indicating parts that need further review by another guide and/or by an automated system. For instance, in this case, the people in output 714 may be flagged to indicate that they need to replace the target recipients identified in the previous portion 704 of speech segment 702.

The output 712 from the first guide 708 and the output 714 from the second guide 710 may then be sent to an editor guide 716 for further processing or review. In some examples, the editor guide 716 may be presented with an editor guide user interface that includes the identified chunks of text and corresponding semantic labels from each of the first guide 708 and the second guide 710. The editor guide 716 may then make modifications to the chunks of texts and/or semantic labels via the editor guide user interface. In further examples, the editor guide 716 may be presented with different representations of the output 712 and 714 from the first guide 708 and second guide 710 as well or instead.

For instance, the editor guide 716 may be presented with a visual representation of a task that includes information received from each of the guides processing portions of the speech segment. In particular, a digital email template 718 with information filled into the fields based on output 712 and 714 from guides 708 and 710 may be presented to editor guide 716. The editor guide 716 may then modify the email 718 to ensure that global context is maintained and to correct any other errors before sending the email. For instance, the editor guide 716 may resolve the conflict between the people identified as target recipients by the first guide 708 and the second guide 710. In some examples, the editor guide 716 may be able to listen to portions of an audio recording or view transcribed text via an editor guide user interface to resolve the conflict. Accordingly, the editor guide 716 may be able to identify from an editor guide interface that the speaker requested a change in target recipients from those identified within the output 712 from the first portion 704 of the speech segment 702 to those identified within the output 714 from the second portion 706 of the speech segment 702. In some examples, the editor guide 716 may send the email 718 after reviewing it. In other examples, the filled-in email 718 may be returned to the user for review before sending.

In additional examples, certain steps of the processes described within example systems, including transcription, breaking text into chunks, semantic labeling, and/or editing of tasks, may be performed by a user who issued the spoken command instead of or in addition to one or more guides.

For instance, an automated response system and/or one or more guide computing devices may provide feedback to a user (e.g., of a smartwatch) when the user has not provided enough context information to complete a requested task. In additional examples, certain steps requiring context information may be returned to a user for completion. Other divisions of labor between one or more guide computing devices, one or more automated response systems, and/or a user issuing a spoken command are also possible.

IV. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

We claim:

1. A method comprising:
receiving a speech segment from a client device via a communication network;
determining a textual representation of the speech segment;
causing one or more guide computing devices to display one or more portions of the textual representation within one or more guide user interfaces that enable placement of boundaries separating groups of words in the textual representation to divide the textual representation into chunks such that each chunk describes information for a respective email field, wherein the one or more guide computing devices are separate from the client device;
receiving, from the one or more guide user interfaces, input data that specifies placement of a plurality of boundaries within the textual representation to divide the textual representation into a plurality of identified chunks;
autonomously determining, based on the input data received from the one or more guide user interfaces, a plurality of email fields corresponding to the plurality of identified chunks of the textual representation; and
determining a digital email template that includes the plurality of email fields, wherein each email field is filled in with information based on a corresponding identified chunk from the plurality of identified chunks of the textual representation.

2. The method of claim 1, further comprising:
causing the one or more guide computing devices to play an audio recording of one or more portions of the speech segment; and
determining at least some of the textual representation based on input data received from the one or more guide computing devices.

3. The method of claim 2, further comprising adjusting a playback rate of the audio recording of the one or more portions of the speech segment based on word density.

4. The method of claim 1, further comprising:
causing the one or more guide computing devices to display the identified chunks;
receiving input data from the one or more guide computing devices indicating one or more corrections to the identified chunks; and
causing the one or more guide computing devices to display the identified chunks with the one or more corrections.

5. The method of claim 1, further comprising causing the one or more guide computing devices to display the digital email template that includes the plurality of email fields, wherein each email field is filled in with information based on the corresponding identified chunk from the plurality of identified chunks of the textual representation.

6. The method of claim 1, further comprising receiving one or more identified chunks within a first contiguous portion of the textual representation from a first guide computing device and receiving one or more identified chunks within a second contiguous portion of the textual representation from a second guide computing device.

7. The method of claim 6, further comprising causing an editor guide computing device to display a graphical interface that includes the digital email template, wherein the digital email template is filled based on the one or more identified chunks received from the first guide computing device and the one or more identified chunks received from the second guide computing device.

8. The method of claim 7, further comprising:
receiving input data from the editor guide computing device indicating one or more modifications to an email field of the digital email template; and
causing the editor guide computing device to display the digital email template with the one or more modifications to the email field.

9. A system, comprising:
one or more guide computing devices; and
a control system configured to:
receive a speech segment from a client device via a communication network;
determine a textual representation of the speech segment;
cause the one or more guide computing devices to display one or more portions of the textual representation within one or more guide user interfaces that enable placement of boundaries separating groups of words in the textual representation to divide the textual representation into chunks such that each chunk describes information for a respective email field, wherein the one or more guide computing devices are separate from the client device;
receive, from the one or more guide user interfaces, input data that specifies placement of a plurality of boundaries within the textual representation to divide the textual representation into a plurality of identified chunks;
autonomously determine, based on the input data received from the one or more guide user interfaces, a plurality of email fields corresponding to the plurality of identified chunks of the textual representation; and
determine a digital email template that includes the plurality of email fields, wherein each email field is filled in with information based on a corresponding identified chunk from the plurality of identified chunks of the textual representation.

10. The system of claim 9, wherein the one or more guide computing devices are configured to play an audio recording of one or more portions of the speech segment, and wherein the control system is configured to determine at least some of the textual representation based on input data received from the one or more guide computing devices.

11. The system of claim 9, wherein the one or more guide computing devices are configured to:
display one or more of the plurality of identified chunks;
receive input data indicating one or more corrections to the one or more identified chunks; and
display the one or more identified chunks with the one or more corrections.

12. The system of claim 9, wherein the one or more guide computing devices are configured to display the digital email template that includes the plurality of email fields, wherein each email field is filled in with information based on the corresponding identified chunk from the plurality of identified chunks of the textual representation.

13. The system of claim 9, wherein the control system is configured to receive one or more identified chunks within a first contiguous portion of the textual representation from a first guide computing device and receive one or more identified chunks within a second contiguous portion of the textual representation from a second guide computing device.

14. The system of claim 13, further comprising an editor guide computing device that is configured to:
display a graphical interface that includes the digital email template, wherein the digital email template is filled based on the one or more identified chunks received from the first guide computing device and the one or more identified chunks received from the second guide computing device;
receive input data indicating one or more modifications to an email field of the digital email template; and
display digital email template with the one or more modifications to the email field.

15. The system of claim 9, wherein the client device comprises a head-mountable device.

16. A non-transitory computer readable medium having stored therein instructions, that when executed by one or more computing systems, cause the one or more computing systems to perform functions comprising:
receiving a speech segment from a client device via a communication network;
determining a textual representation of the speech segment;
causing one or more guide computing devices to display one or more portions of the textual representation within one or more guide user interfaces that enable placement of boundaries separating groups of words in the textual representation to divide the textual representation into chunks such that each chunk describes information for a respective email field, wherein the one or more guide computing devices are separate from the client device;
receiving, from the one or more guide user interfaces, input data that specifies placement of a plurality of boundaries within the textual representation to divide the textual representation into a plurality of identified chunks;
autonomously determining, based on the input data received from the one or more guide user interfaces, a plurality of email fields corresponding to the plurality of identified chunks of the textual representation; and determining a digital email template that includes the plurality of email fields, wherein each email field is filled in with information based on a corresponding identified chunk from the plurality of identified chunks of the textual representation.

* * * * *